United States Patent [19]

Silverman

[11] 4,140,485
[45] Feb. 20, 1979

[54] CONVEYOR BELT STRUCTURE

[75] Inventor: Stanley Silverman, Denville, N.J.

[73] Assignee: Sun Chemical Corporation, New York, N.Y.

[21] Appl. No.: 854,030

[22] Filed: Nov. 22, 1977

[51] Int. Cl.² .............................................. F27D 3/00
[52] U.S. Cl. .................................... 432/239; 198/847; 432/121
[58] Field of Search ...................... 432/121, 140, 239; 198/844, 846, 847

[56] References Cited

U.S. PATENT DOCUMENTS

| 779,981 | 1/1905 | White | 198/840 |
| 2,028,479 | 1/1936 | Spicer | 432/239 X |
| 2,855,093 | 10/1958 | Ek | 198/846 |
| 2,870,490 | 1/1959 | Freedlander | 198/844 X |

Primary Examiner—John J. Camby
Attorney, Agent, or Firm—Cynthia Berlow

[57] ABSTRACT

A high temperature-resistant, open-mesh fabric conveyor belt for conveying graphic arts printed or coated material over a vacuum bed and through a high temperature oven is described. A V-belt is secured to the open-mesh fabric to center and guide the belt wherein the V-belt is guided by suitable guide slots in suitable guide members which require no adjustments for guiding. The V-belt is vulcanized to a strip of cotton tape, and the strip is, in turn, sewn to the open-mesh belt by a high temperature-resistant thread. In one embodiment, a single V-belt is centrally located on the belt. In a second embodiment, two V-belts are located adjacent to the respective opposite edges of the belt. In a narrow conveyor belt, a single V-belt can be provided at one edge of the conveyor belt.

12 Claims, 5 Drawing Figures

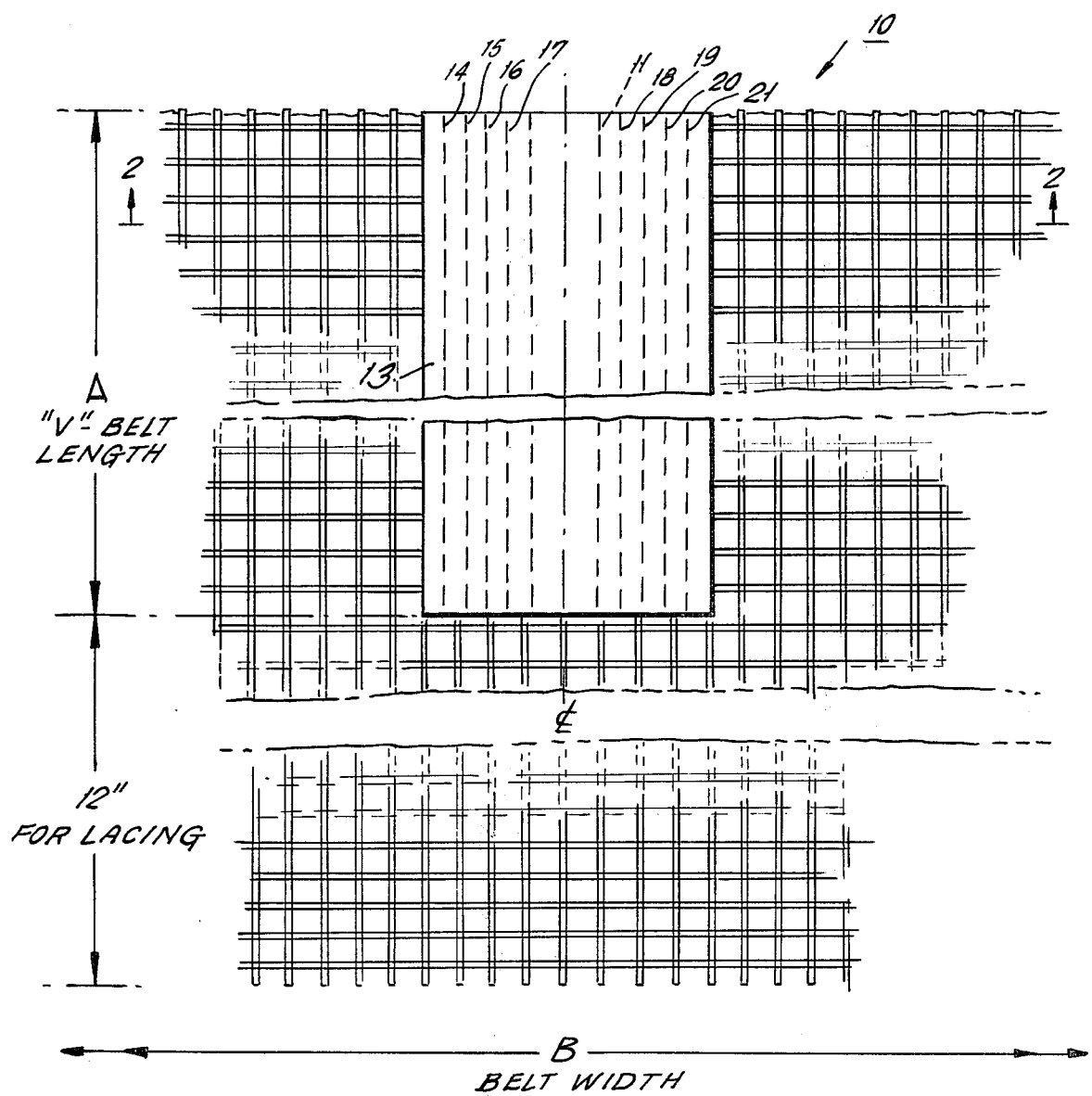
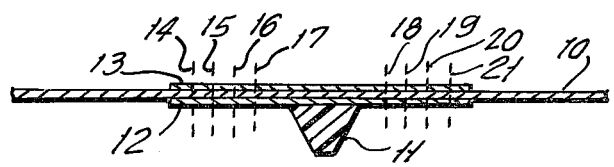

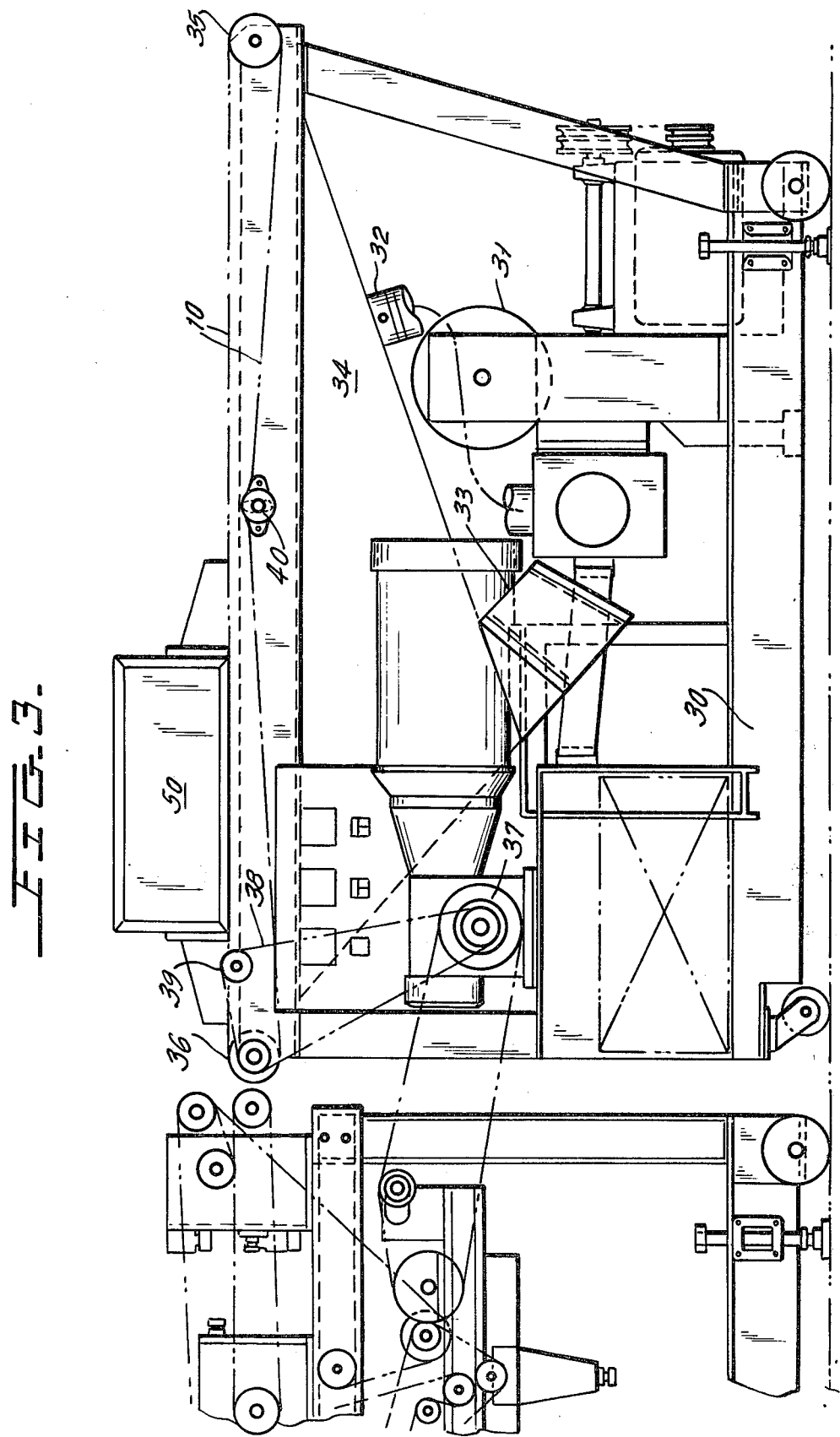

CONVEYOR BELT STRUCTURE

BACKGROUND OF THE INVENTION

This invention relates to conveyor belt structures for conveying materials into a heated oven, and more particularly relates to a novel construction for securing a guide V-belt to an open-mesh fabric belt of high temperature-resistant material.

The guiding of endless conveyor belts is a well known art. Such conveyor belts when of substantially non-extensible material, such as rubber or cotton, may be guided for high speed movement through the use of crowned rollers and through the use of suitable adjustable rollers. Cotton and rubber belts have also been successfully guided without the use of crowned rollers or adjustable rollers by securing a V-cross section belt to their underside and permitting this V-belt to run in a grooved roller of pulley to guide the entire belt against lateral drift. The V-belts are easily secured to solid rubber or cotton belts by a vulcanization process.

Conveyor belts are required to convey printed or coated graphic arts material from the printing apparatus into curing or drying ovens. These belts are preferably belts using an open-mesh fabric so that they can move over a vacuum bed which will assist in holding printed or coated sheets on the belt. Further, the open-mesh fabric belt material must be one which is resistant to the relatively high temperatures of the curing or drying oven. In view of the open-mesh construction of these belts, they are generally extensible and have no lateral stability since they will easily flex (or wrinkle) in the plane of the web. Open-mesh or net-type materials which have been used for this purpose have used fiber glass filaments woven into an open-mesh form. These filaments have also been made of plastics including a plastic known by the trademark Kevlar made by duPont. Other similar materials which are coated with Teflon have been used. It has been found that these materials will not permit chemical bonding to the conventional V-belt used for guiding conveyor belts of prior art and, as a result, guiding has been attempted through the use of crowned rollers and adjustable rollers and the like. However, the extensibility of the open mesh web requires frequent manual tension adjustments, particularly when oven temperatures are changed or when conveyor belt speed is changed.

BRIEF DESCRIPTION OF THE PRESENT INVENTION

The present invention provides a novel connection between a V-belt and an open-mesh fabric conveyor belt which is of the type which will not readily chemically bond to a conventional V-belt. In this application, the term "V-belt" is intended to describe any longitudinally extending thin body which extends out of the plane of the bottom conveyor belt surface. Such belts conventionally have tapered sides to assist the movement of the belt in a guide slot, and for this reason they are termed "V-belts". The V-belt used in accordance with this invention can have any desired cross-sectional appearance although, in the preferred embodiment, it will have the appearance of a truncated isosceles triangle.

More specifically, and in accordance with the invention, a conventional rubber V-belt is first secured to an elongated cotton tape or other tape which will readily chemically bond, as by vulcanization, to the rubber V-belt. This elongated tape is then located on the bottom surface of the open-mesh conveyor belt. A second elongated strip which is co-extensive with the cotton strip is then placed atop the open-mesh belt. The two strips are then sewn together through the open mesh by several longitudinally extending, parallel sewn lines using a thread which is of a high temperature-resistant material. The upper elongated strip should also be of a high temperature-resistant material, such as fiber glass or Kevlar. A single V-belt can be sewn along or near the longitudinal center of the mesh fabric belt. If desired, two such belts can be sewn along the respective opposite edges of the conveyor belt. For narrow conveyors one V-belt at one edge can be used. V-belts may then be suitably guided in notched roller guides or pulleys to provide positive lateral guidance of the open-mesh fabric belt and various problems experienced in the past of pulley and roller adjustment are now avoided.

BRIEF DESCRIPTION OF THE DRAWINGS

FIG. 1 is a plan view of a portion of a belt constructed in accordance with the present invention.

FIG. 2 is a cross-sectional view of FIG. 1 taken across the section line 2—2 in FIG. 1.

FIG. 3 is an elevational view of a vacuum bed conveyor apparatus which uses the novel belt of the present invention for conveying material into a heating oven.

DETAILED DESCRIPTION OF THE DRAWINGS

Figure 4:
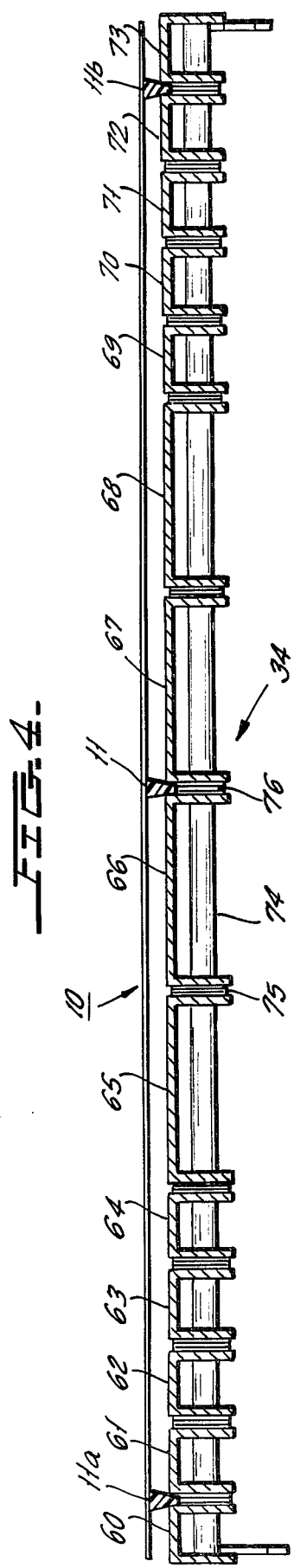
FIG. 4 is a cross-sectional view of the bed assembly of the conveyor of FIG. 3.

Referring first to FIGS. 1 and 2, there is shown therein the novel conveyor belt 10 of the present invention. The belt 10 is an open-mesh belt which has any desired length and width. Typically, the belt 10 may be about 40 inches wide and 200 inches long. The belt is commonly an endless belt and for this purpose of 12-inch length of the belt is left to permit overlap of the mesh and lacing to the other end of the belt, thereby causing the V-belt to be continuous by butting end to end. A mechanical wired hinge type seam can also join the ends in place of lacing.

In accordance with the invention and in the embodiment of FIGS. 1 and 2, a rubber V-belt 11 is fixed to the open-mesh belt 10 even though the material of the open-mesh belt 10 is such that it would prevent chemical bonding to the rubber belt 11 as by the usual vulcanizing process. Thus, the mesh material may be of fiber glass or a Teflon-coated material or of some other high temperature-resistant material, such as a 1590 Kevlar or Nomex.

In accordance with the invention and as best seen in FIG. 2, a narrow width 12 of cotton duck or similar material has the elongated belt 11 bonded thereto as by vulcanization. Strip 12 is about 2 inches wide in one embodiment of the invention, as contrasted to the belt 10 width of about 40 inches. Belt 11 is of rubber and is about ½ inch in width and ½ inch high. The sides of belt 11 are tapered as shown.

An upper strip 13 which is about 2 inches wide, as was the strip 12, extends co-extensively with the strip 12 and may be a Kevlar tape or a flexible tape of some other high temperature-resistant material. Strip 13 serves as a backing means for permitting the cotton tape 12 to be sewn to the open-mesh belt 10. Thus, in FIG. 2, 4 sewn lines are formed on each side of the V-belt 11 and are shown as lines of stitching 14 to 17 and 18 to 21. Any desired number of lines of sewing can be used. The thread used for sewing strips 11 and 12 together is preferably a Kevlar thread or some other thread of high temperature-resistant material. It has been found that this sewing operation will securely fix the V-belt 11 to the open-mesh belt 10 even under extremely high speed operation for the conveyor belt.

Figure 5:
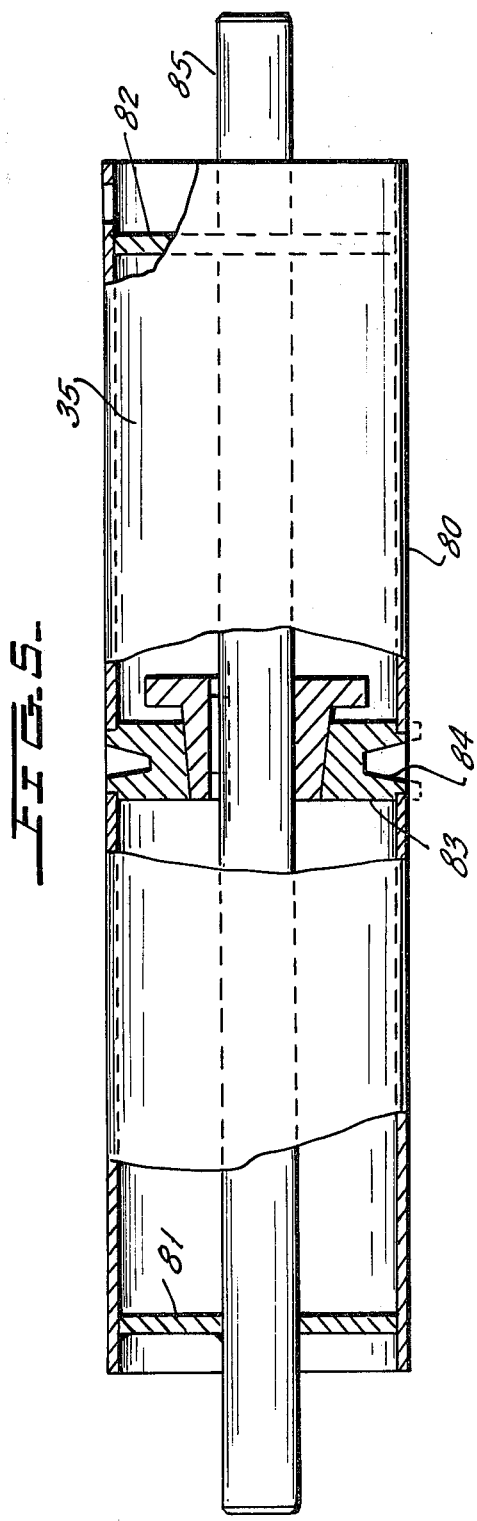
FIG. 5 is an elevational view of one of the rollers of FIG. 3 and illustrates the presence of the guide groove in the roller for receiving the V-belt.

FIGS. 3, 4 and 5 illustrate the manner in which the belt 10 is conveyed in a typical oven application. In FIG. 3, a suitable steel frame 30 carries a vacuum blower 31 which is ultimately connected to the vacuum plenum 32 and the vacuum plenum 33. These produce a low pressure within the vacuum chamber 34 which is disposed beneath the web 10, shown in dot-dash lines in FIG. 3. The web 10 in FIG. 3 runs over the idler roller 35 and around the driven roller 36 which is driven by a drive motor 37. A belt 38 connects drive motor 37 to the end of roller 36 and belt 38 also rides over the tension adjustment roller 39. The conveyor belt 10 has suitable tension applied thereto by running over a tension-applying roller 40 in the conventional manner. Note that roller 40 bears on the outside surface of the belt and that the V-belt 11 will be on the inside of the conveyor belt.

The conveyor belt then passes through a curing oven 50 which, in the case of FIG. 3, is an ultra-violet curing oven, although the oven can be of any desired type. It will be understood that printed or coated material is deposited atop the web 10 and is then conveyed toward the oven 50 from right to left in FIG. 3. The presence of the vacuum from the vacuum chamber 34 will serve to hold loose printed or coated material atop the web even though the web is moving rapidly.

FIG. 4 shows a cross-sectional view of the vacuum table of FIG. 3 and it will be seen that the vacuum table is made up of a plurality of elongated aluminum channels which are clamped together to define the width of the table. Thus, in FIG. 4 aluminum channels 60 to 73 receive an aluminum rod 74 which extends through aligned openings in the channels. The opposing sides of the channels are spaced from one another by washers, such as the stacked washers 75 between channels 65 and 66 and washers 76 between channels 66 and 67. Several spaced aluminum rods such as rod 74 will be disposed along the length of the vacuum bed assembly so that a plurality of slots extending along the length of the conveyor are defined above the vacuum bed where the slots are greater in number toward the outer edges of the conveyor belt than they are toward the center of the conveyor belt for holddown of the edges of varying width sheets. This configuration will then apply positive pressure above the conveyor belt 10 in FIG. 4 on articles which are on top of the belt 10 in order to hold the objects in place as the belt moves through the oven in FIG. 3.

It should be noted in FIG. 4 that the guide V-belt 11 fits within the space between channels 66 and 67 to enable the belt 10 to lie flush atop the conveyor bed assembly.

Note further that the V-belt 11 could have been replaced by identical V-belt members, such as V-belt members 11a and 11b which are disposed at the outer edges of the belt 10 and which ride in the slots defined between channels 60–61 and 72–73, respectively.

The V-belts of the preceding figures are guided against lateral movement by the guide rollers about which they move or by suitable guide pulleys which may be located as desired. FIG. 5 shows the roller 35 as consisting of the tubular cylinder 80 which is fixed on spaced end plates 81 and 82 and on a central V-notched plate 83. Cylinder 80 may be fixed to the plates 81, 82 and 83 as by welding or the like. The central member 83 has a V-notch 84 therein which receives the belt 11 when the belt is centrally located on web 10. The plates 81, 82 and 83 then are secured to a central tubular support 85 which is supported within the housing in FIG. 3. Note that, if the belt 10 of FIG. 4 had the V-belt member disposed at its outer edges, the roller of FIG. 5 would have been suitably modified with V-notches at corresponding locations.

Although a preferred embodiment of this invention has been described, many variations and modifications will now be apparent to those skilled in the art, and it is preferred therefore that the instant invention be limited not by the specific disclosure herein by only by the appended claims.

I claim:

1. A conveyor belt of high temperature-resistant open-mesh fabric for conveying materials over a vacuum bed and into a high temperature oven; said conveyor belt having an elongated V-belt cross-section guide secured to the bottom surface thereof and extending along the length of said belt and parallel to the edges of said belt; first and second elongated, flexible fabric strips; said V-belt being bonded to said elongated first fabric strip; said first fabric strip being disposed along one surface of said belt; said second fabric strip being of high temperature-resistant material and being disposed on the opposite side of said belt and being co-extensive with said first fabric strip; and stitching lines of thread of high temperature-resistant material sewing together said first and second fabric strip and said belt, thereby to secure said V-belt to said conveyor belt.

2. The conveyor belt of claim 1 wherein said open-mesh fabric is of a material which resists chemical bonding with said V-belt.

3. The conveyor belt of claim 2 wherein said first fabric is a cotton-type fabric and wherein said V-belt is vulcanized thereto.

4. The conveyor belt of claim 2 wherein said V-belt is located in about the middle of the width of said conveyor belt.

5. The conveyor belt of claim 2 wherein said V-belt is located adjacent one edge of said conveyor belt.

6. The conveyor belt of claim 5 which includes a second V-belt fixed adjacent to the edge opposite said one edge of said conveyor belt.

7. An endless conveyor belt for conveying graphic arts material through a curing oven; said curing oven comprising a generally closed heating chamber receiving said endless conveyor belt; said endless belt being an open mesh; a vacuum bed disposed beneath portions of said conveyor belt within said oven to hold graphic arts materials on said conveyor belt by differential pressure; guide roller means for guiding said conveyor belt around a closed path; and drive means for driving said endless belt; said conveyor belt having an elongated V-belt cross-section guide secured to the bottom surface thereof extending along the length of said conveyor belt and parallel to the edges of said conveyor belt; said V-belt being bonded to an elongated first fabric strip; said first fabric strip being disposed along one surface of said conveyor belt; a second fabric strip of high temperature-resistant material disposed on the opposite side of said conveyor belt and being co-extensive with said first fabric strip; and stitching lines of thread of high temperature-resistant material for sewing together said first and second fabric strips and said conveyor belt, thereby to secure said V-belt to said conveyor belt; said guide roller means having depressions in the surfaces thereof for receiving said V-belt and allowing substantially the full surface of said conveyor belt to grip the outer surfaces of said conveyor belt.

8. The conveyor belt of claim 7 wherein said mesh is of a material which resists chemical bonding with said V-belt.

9. The conveyor belt of claim 8 wherein said first fabric strip is a cotton-type fabric and wherein said V-belt is vulcanized thereto.

10. The conveyor belt of claim 8 wherein said V-belt is located in about the middle of the width of said conveyor belt.

11. The conveyor belt of claim 8 wherein said V-belt is adjacent to one edge of said conveyor belt.

12. The conveyor belt of claim 11 which includes a second V-belt fixed adjacent to the edge opposite said one edge of said conveyor belt.

* * * * *